March 15, 1932.  H. N. OTT  1,849,151
PROJECTION APPARATUS
Filed Feb. 1, 1928   2 Sheets-Sheet 1
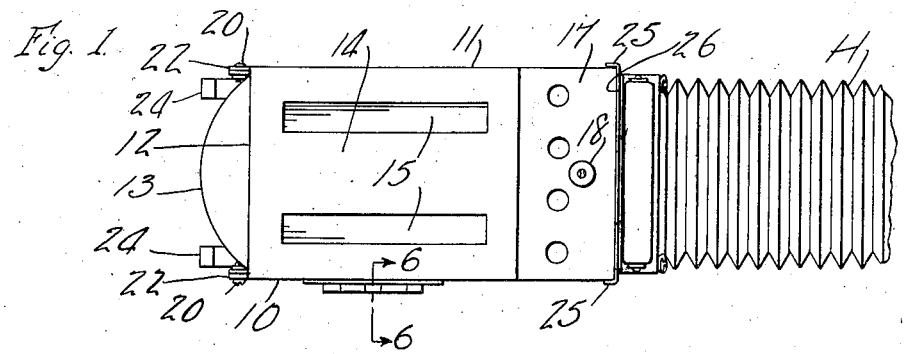
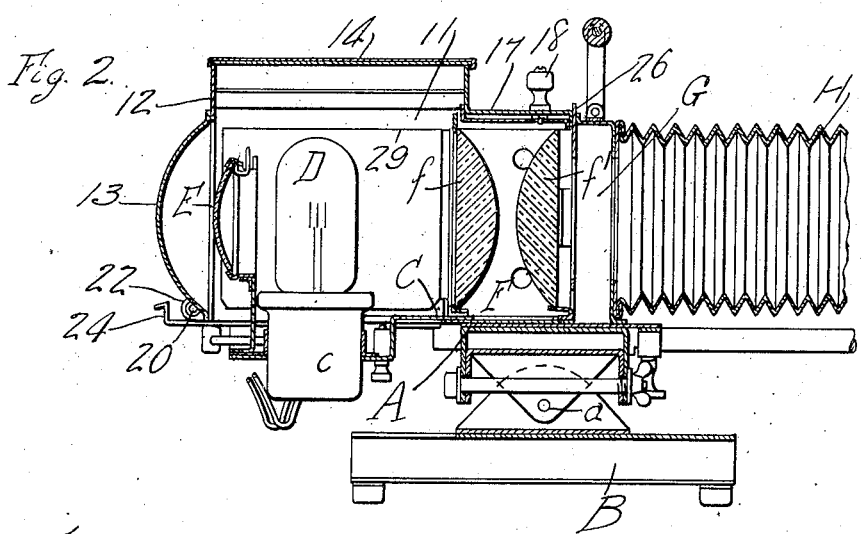
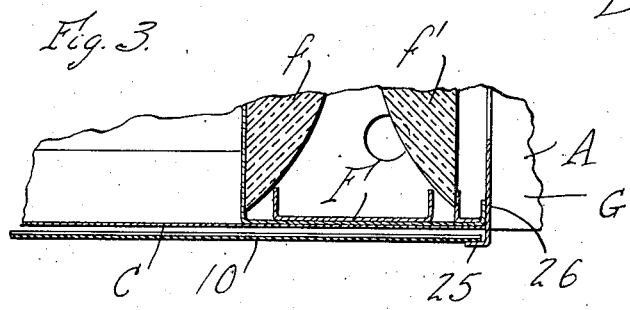
INVENTOR.
Harvey N. Ott
by Parker & Prochnow
ATTORNEYS.

March 15, 1932.　　　　H. N. OTT　　　　1,849,151

PROJECTION APPARATUS

Filed Feb. 1, 1928　　　2 Sheets-Sheet 2

INVENTOR.
Harvey N. Ott
by Parker & Prochnow
ATTORNEYS.

Patented Mar. 15, 1932

1,849,151

UNITED STATES PATENT OFFICE

HARVEY N. OTT, OF BUFFALO, NEW YORK, ASSIGNOR TO SPENCER LENS COMPANY, OF BUFFALO, NEW YORK

PROJECTION APPARATUS

Application filed February 1, 1928. Serial No. 251,037.

This invention relates to apparatus for projecting transparencies or other objects upon a screen or other surface, and more particularly to the portion of the apparatus enclosing the lamp or source of light.

In apparatus of this kind it frequently happens that the incandescent lamp becomes burned out so that it must be replaced by another lamp. Because of the large amount of heat produced by such lamps, the removal of the lamp from a lighthouse or housing of a type heretofore used in which the top or a side only can be removed or swung into an open position, is attended with considerable difficulty and the operator frequently receives severe burns in removing the lamp, due to his hands coming into contact with other portions of the lighthouse. In other constructions which have attempted to eliminate this difficulty, the lamp and its socket were made removable from the housing either alone or together with some part of the optical system, such for example, as the reflector, but apparatus of this kind, while making it easier to remove and replace the lamp, involves the objection that the lamp or the parts of the optical system are seldom replaced into their correct positions so that further manipulation and adjustment of the optical system is necessary before satisfactory projection can be resumed.

The objects of this invention are to provide a light housing for a projection apparatus which is so mounted that the entire lighthouse can be moved out of its operative position to render the incandescent lamp accessible and without moving any of the parts of the optical system out of their adjusted positions; also to provide a projection apparatus of this kind in which the lighthouse is mounted to move into a position in which the heat from the walls of the lighthouse will not affect any portion of the projection apparatus; also to provide a lighthouse of this kind with an aperture and reflector which may be used for illuminating a space at the side of the projection apparatus, and which aperture may readily be closed when not needed; also to improve the construction of apparatus of this kind in other respects hereinafter specified.

In the accompanying drawings:

Fig. 1 is a top plan view of the rear portion of a projection apparatus embodying this invention.

Fig. 2 is a fragmentary, central, sectional elevation thereof.

Fig. 3 is a fragmentary, sectional plan view of a side of the lighthouse when the same is in closed position.

Figure 4:
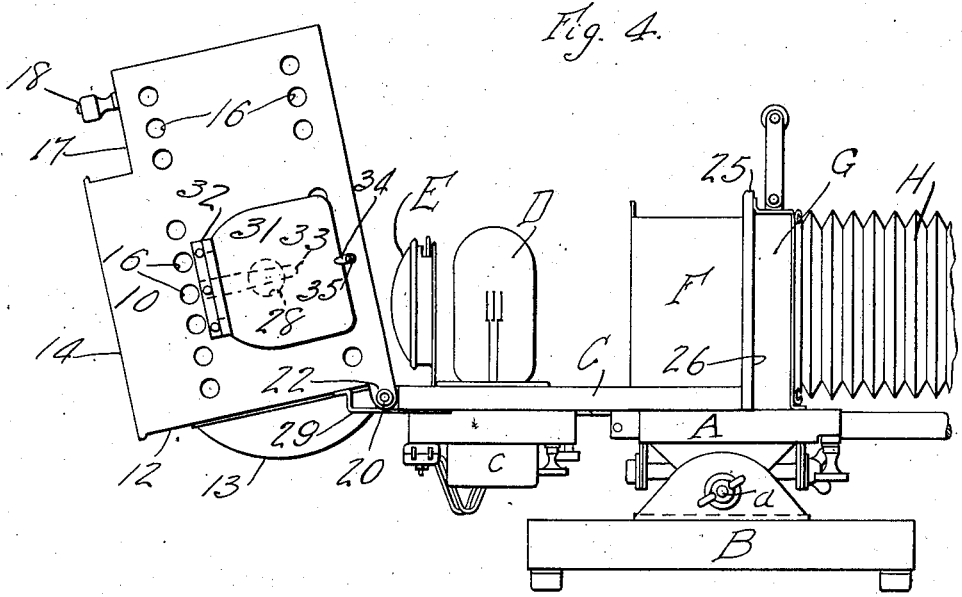
Fig. 4 is a side elevation of the rear portion of a projection apparatus showing the lighthouse thrown backward into its inoperative position.

My improved lighthouse may be used in connection with a projection apparatus of any suitable or desired construction, that shown in the accompanying drawings, by way of illustration, including a base A on which the parts of the projection apparatus are mounted and which is adjustable relatively to a support or stand B about a horizontal axis or pivot $a$. The base A has a rearwardly extending portion or extension C on which is mounted a socket $c$ for an electric incandescent lamp D of any suitable or usual kind. In rear of the lamp D is a reflector E, which is preferably adjustably mounted upon the rearwardly extending portion C of the base A. The lamp socket $c$ and the reflector E are preferably adjustably mounted on the extension C of the base A of the projection apparatus so that the filament of the incandescent lamp and the reflector E may be placed into correct relation to each other and to the condenser lenses $f$ and $f'$, and the mechanism for effecting these adjustments may be of any suitable or usual kind. The base A also supports a housing F for the condensing lenses $f$ and $f'$ in front of which is a chamber G adapted to receive the transparencies which are to be projected. H represents the usual bellows through which the light rays pass to the front portion of the projection apparatus which is not shown in the drawings. All of these parts have heretofore been used in connection with projection apparatus and by themselves, except as hereinafter specified, constitute no part of my invention.

The rear portion of the extension C of the base A forms a base or support for the lighthouse, which extends rearwardly from the housing F for the condenser lenses. The lighthouse is preferably mounted on the projection apparatus to move rearwardly completely out of the vicinity of the incandescent lamp or bulb D and without moving or changing the adjustment of the reflector lamp or other part of the optical system.

In the particular construction shown, the lighthouse includes side walls 10 and 11 which are joined by a rear wall 12, having a rearward extension or bowed out portion 13 into which the reflector E may extend. The lighthouse also includes a top 14 having the usual louvers 15, and the side walls may also be provided with vent openings 16 whereby currents of air may circulate through the lighthouse to cool the same, the sides of the lighthouse being preferably provided with inner partitions 29 to prevent light from passing through the vent openings 16. The front portion of the top of the lighthouse which extends over the condenser housing F is arranged at a lower elevation from the portion 14, as indicated at 17 and is provided with a knob or handle 18.

The lighthouse may be supported in any suitable or desired manner so as to be movable completely out of operative relation to the lamp D, and in the particular construction shown the lower rear portion of the lighthouse is pivoted or hinged at 20 at the rear portion of the part C of the base of the projection apparatus. The pivotal connection between the lighthouse and the base therefor may be effected in any suitable or desired manner. For example, the side walls of the lighthouse may be provided with rearwardly extending lugs or projections 22 through which the pivot bolt 20 passes, this bolt also passing through portions of the base C of the lighthouse. The base C may also be provided with a rearwardly extending bracket or support 24 secured thereto and adapted to engage the rear wall of the lighthouse to limit the extent to which the same may be swung rearwardly, or in other words to support the same in its open position as indicated in Fig. 4. When the lighthouse is swung into its operative or closed position, the front edges of the side walls 10 and 11 preferably move into engagement with rearwardly extending flanges or projections 25 of a transverse plate 26 forming a part of the front wall of the condenser housing F, and the front edges of the portions 17 of the top wall of the lighthouse may also abut against this plate 26.

Figure 5:
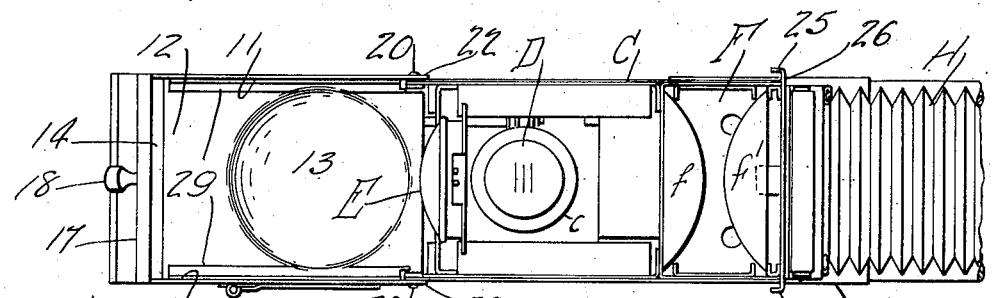
Fig. 5 is a top plan view thereof.

By means of the construction thus far described it will be evident that whenever it is necessary to gain access to the incandescent lamp D, it is only necessary to swing the movable part of the lighthouse by means of the knob or handle 18 rearwardly about its pivot from the positions shown in Figs. 1 and 2, to the positions shown in Figs. 4 and 5, whereupon the incandescent lamp will be readily accessible from either side or from the top thereof. This will make it readily possible for an operator to reach the incandescent lamp and remove the same without being in danger of contacting with any of the hot portions of the lighthouse. Furthermore it will be noted that the movement of the lighthouse into either its operative or its inoperative position does not in any way affect the adjustment of the incandescent lamp D or the reflector E with reference to each other or with reference to the condenser lenses $f$ and $f'$. Consequently a burned out lamp may be readily replaced by another lamp with but a slight delay. Also by moving the lighthouse rearwardly as shown, beyond the rear end of the projection apparatus, the heat from the lighthouse cannot damage any part of the projection apparatus.

Figure 6:
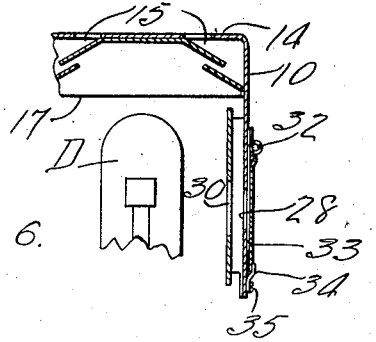
Figs. 6 and 7 are fragmentary, sectional elevations on line 6—6, Fig. 1, showing means for illuminating a table or support at the side of the projection apparatus.
Figure 7:
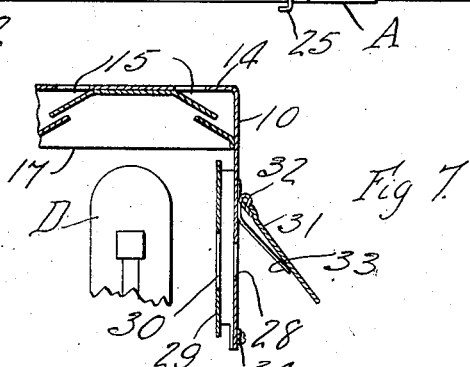

It is sometimes desirable to illuminate a small surface at the side of the projection apparatus for the purpose of seeing notes or for examining the objects to be projected, but such light should be restricted to a comparatively small area, so as not to obscure the picture on the screen. For this purpose, in the projection apparatus shown, one of the walls of the lighthouse, for example, the side wall 10 is provided with an opening 28 adjacent to the filament of the lamp D, and where an inner wall 29 is used to prevent the escape of light through the ventilating openings 16 in the side wall a corresponding aperture 30 is provided in the inner wall 29. In order to deflect the light passing out through the apertures 30 and 28 downwardly on a substantially horizontal support, and also for closing the apertures when the light is not required, a combined door and reflector 31 is provided, which may, for example, be hinged at its upper portion at 32 on the side wall 10 of the lighthouse. The inner face of the hinged door and reflector 31 is preferably coated with any suitable composition, such, for example, as white paint or enamel which diffuses the light over the surface to be illuminated. The hinged member 31 is preferably held in its outer position as shown in Fig. 7 by means of a spring 33 suitably secured to the side wall 10 of the lighthouse. When it is desired to shut off the passage of light out of the light housing, the hinged member 31 may be held in its closed position by means of a locking member or catch 34 pivoted at 35 so that the locking member may swing into holding position as indicated in Fig. 6 for securing the pivoted member or door 31 in its closed position against the action of the spring 33. Consequently when the locking member is released, the spring 33 immediately swings the hinged door into its inclined or reflecting position. The hinged member 31 prevents the light which passes out of the lighthouse from obscuring the projection of objects on a screen by confining this light to a table or support immediately adjacent to the projection apparatus. The light thus discharged from the lighthouse may be used, for example, by a lecturer for reading his notes or by the operator for examining the objects to be projected, or for any other purpose. When the hinged member is in its closed position, it occupies practically no additional space, so that the projection apparatus may be just as easily transported or packed as if the hinged member were not used.

Claims:—

1. In an apparatus for projecting transparencies, the combination of a base, a lamp mounted on said base and projecting approximately perpendicular thereto, a reflector mounted on said base in rear of and at the side of said lamp, whereby a maximum beam of light will be projected in a direction sidewise of said lamp, a lighthouse mounted on said base to cover said lamp and said reflector, said lighthouse having rearwardly projecting lugs at the lower rear portions thereof, and a pivot connecting said lugs and said base to permit said lighthouse to swing rearwardly about said pivot, and out of operative relation to said lamp and reflector.

2. In an apparatus for projecting transparencies, the combination of a base supporting an optical system and an incandescent lamp, said optical system including a reflector arranged in the rear of said lamp, said lamp projecting from its base and in a direction transversely of the axis of said optical system at the lamp, a lighthouse, including walls and a top, and cooperating with said base to inclose said lamp and reflector, and means for removably mounting said lighthouse to permit the same to move rearwardly out of operative relation to said lamp and reflector.

3. In an apparatus for projecting transparencies, the combination of a base supporting an optical system and an incandescent lamp arranged in operative relation thereto, said lamp projecting approximately perpendicularly from said base across the axis of said optical system, a lighthouse, including sides and a top, and cooperating with said base to inclose said lamp and at least a part of said optical system, and a pivotal connection between the rear portion of said lighthouse and said apparatus for permitting said lighthouse to swing rearwardly out of operative relation to said lamp and optical system.

4. In an apparatus for projecting transparencies, the combination of a base mounting an optical system, an incandescent lamp having a socket mounted on said base with the lamp projecting from its socket in a direction cross-wise of the axis of the optical system and approximately perpendicular to the base, said optical system including a reflector disposed at one side of said lamp whereby a beam of maximum intensity will be directed along the optical system from said lamp, and a housing for said lamp and reflector normally fully inclosing said lamp and reflector, and movable into a position in which it fully exposes the free end of said lamp and said reflector.

HARVEY N. OTT.